United States Patent
Suto et al.

(10) Patent No.: US 11,377,743 B2
(45) Date of Patent: Jul. 5, 2022

(54) MULTILAYER STRUCTURE AND METHOD FOR PRODUCING MULTILAYER STRUCTURE

(71) Applicants: JFE Steel Corporation, Tokyo (JP); NATIONAL UNIVERSITY CORPORATION HOKKAIDO UNIVERSITY, Sapporo (JP)

(72) Inventors: Mikito Suto, Tokyo (JP); Takeshi Suzuki, Tokyo (JP); Yusuke Nakagawa, Tokyo (JP); Katsumi Kojima, Tokyo (JP); Hiroki Habazaki, Sapporo (JP); Yuki Satoh, Sapporo (JP)

(73) Assignees: JFE Steel Corporation, Tokyo (JP); National University Corporation Hokkaido University, Hokkaido (JP)

( * ) Notice: Subject to any disclaimer, the term of this patent is extended or adjusted under 35 U.S.C. 154(b) by 0 days.

(21) Appl. No.: 16/619,584

(22) PCT Filed: Jun. 8, 2018

(86) PCT No.: PCT/JP2018/022084
§ 371 (c)(1),
(2) Date: Dec. 5, 2019

(87) PCT Pub. No.: WO2018/225861
PCT Pub. Date: Dec. 13, 2018

(65) Prior Publication Data
US 2020/0131645 A1   Apr. 30, 2020

(30) Foreign Application Priority Data
Jun. 9, 2017 (JP) .............................. JP2017-114097

(51) Int. Cl.
*C23C 28/02* (2006.01)
*B01J 21/06* (2006.01)
(Continued)

(52) U.S. Cl.
CPC .............. *C23C 28/02* (2013.01); *B01J 21/063* (2013.01); *B01J 35/004* (2013.01); *B32B 18/00* (2013.01);
(Continued)

(58) Field of Classification Search
CPC ....... C23C 28/345; C23C 28/32; C23C 28/00; C23C 28/02; B32B 18/00; B32B 9/00;
(Continued)

(56) References Cited

U.S. PATENT DOCUMENTS

2008/0268268 A1   10/2008   Masaki et al.
2013/0228467 A1*  9/2013   Miyamoto ............. C25D 17/12
                                                        205/152

FOREIGN PATENT DOCUMENTS

CN   101316654 A   12/2008
CN   101367035 A   2/2009
(Continued)

OTHER PUBLICATIONS

S. Karuppuchamy et al., A novel one-step electrochemical method to obtain crystalline titanium dioxide films at low temperature, Current Applied Physics 9 (2009) 243-248). (Year: 2009).*
(Continued)

*Primary Examiner* — Taylor V Oh
(74) *Attorney, Agent, or Firm* — RatnerPrestia

(57) ABSTRACT

Provided are: a multilayer structure in which a titanium oxide layer exhibits excellent photocatalytic activity; and a method for producing this multilayer structure. The above-described multilayer structure comprises: a conductive part which contains a metal element A other than Ti, while having electrical conductivity; and a titanium oxide layer which is arranged on the conductive part and contains 1.0% by atom or more of the metal element A.

5 Claims, 1 Drawing Sheet

(51) Int. Cl.
  *B01J 35/00* (2006.01)
  *C25D 9/08* (2006.01)
  *B32B 18/00* (2006.01)
  *C23C 28/00* (2006.01)
  *B01J 35/02* (2006.01)

(52) U.S. Cl.
  CPC ............ *C23C 28/32* (2013.01); *C23C 28/345* (2013.01); *C25D 9/08* (2013.01); *B01J 35/02* (2013.01)

(58) Field of Classification Search
  CPC ........ B01J 21/063; B01J 35/004; B01J 35/02; C25D 9/08; C25D 9/12; C25D 9/10
  USPC .......................................................... 428/689
  See application file for complete search history.

(56) References Cited

FOREIGN PATENT DOCUMENTS

| | | | |
|---|---|---|---|
| CN | 102465295 A | * | 5/2012 |
| CN | 102465295 A | | 5/2012 |
| CN | 106245091 A | | 12/2016 |
| EP | 2280094 A1 | | 2/2011 |
| JP | 10314598 A | | 12/1998 |
| JP | 2010082601 A | | 4/2010 |
| JP | 2012036424 A | | 2/2012 |
| JP | 2012057257 A | | 3/2012 |
| JP | 2013119847 A | | 5/2013 |
| JP | 2017073218 A | | 4/2017 |
| JP | 2017087548 A | | 5/2017 |
| JP | 2017094256 | * | 6/2017 |
| WO | 2012035763 A | | 3/2012 |
| WO | 2013144660 A2 | | 10/2013 |
| WO | 2015186827 A1 | | 12/2015 |

OTHER PUBLICATIONS

Ohtani et al., What is Degussa (Evonik) p25? Crystalline composition analysis, reconstruction from isolated pure particles and photocatalytic activity test, Hokkaido University Collection of Scholarly and Academic Papers: HUSCAP, 2010, .p. 1-17. (Year: 2010).*
International Search Report and Written Opinion for International Application No. PCT/JP2018/022084, dated Aug. 28, 2018, 7 pages.
Karuppuchamy et al., "A Novel One-Step Electrochemical Mehtod to Obtain Crystalline Titanium Dioxide Films at Low Temperature", Current Applied Physics, 2009, vol. 9, pp. 243-248.
Extended European Search Report for European Application No. 18813188.2, dated Apr. 22, 2020, 8 pages.
Korean Office Action for Korean Application No. 10-2019-7035741, dated Mar. 5, 2021, 7 pages.
Song, B., et al., "Research Progress of Cu Doped $TiO_2$-based Photocatalysts," Nov. 2013, 4 pages, vol. 32(11), School of Chemical and Environmental Engineering, China University of Mining & Technology, Beijing, China, Bulletin of the Chinese Ceramic Society (abstract only).
Lu, Q., "Study on Photoelectric Properties of Metal Oxide TiO2 and Y2O3 Based Nanomaterials," May 31, 2016, 7 pages (Brief Introduction).
Chinese Office Action with Search Report for Chinese Application No. 201880037224.6, dated Feb. 4, 2021, 12 pages.

* cited by examiner

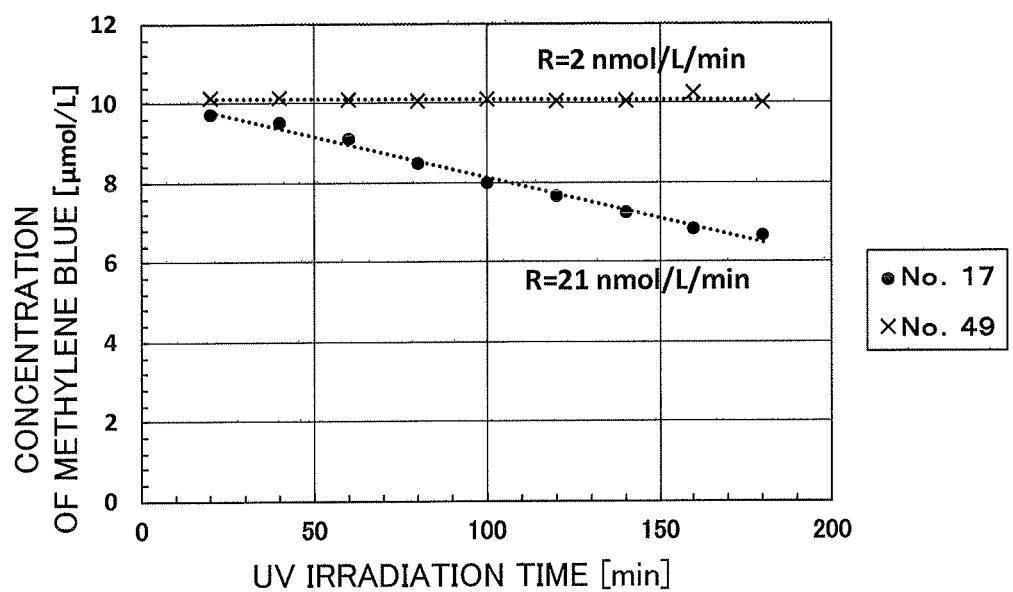

ABSTRACT# MULTILAYER STRUCTURE AND METHOD FOR PRODUCING MULTILAYER STRUCTURE

CROSS REFERENCE TO RELATED APPLICATIONS

This is the U.S. National Phase application of PCT/JP2018/022084, filed Jun. 8, 2018, which claims priority to Japanese Patent Application No. 2017-114097, filed Jun. 9, 2017, the disclosures of these applications being incorporated herein by reference in their entireties for all purposes.

FIELD OF THE INVENTION

The present invention relates to a multilayer structure and a method of producing a multilayer structure.

BACKGROUND OF THE INVENTION

Conventionally, a multilayer structure having a photocatalyst layer such as a titanium oxide layer has been proposed (see Patent Literatures 1 and 2).

PATENT LITERATURES

Patent Literature 1: JP 10-314598 A
Patent Literature 2: JP 2010-082601 A

SUMMARY OF THE INVENTION

In recent years, for the purpose of effectively utilizing multilayer structures having photocatalyst layers such as a titanium oxide layer, a required level of photocatalytic activity of the photocatalyst layers is getting higher.

Aspects of the present invention have been made in view of the above and aim at providing a multilayer structure having a titanium oxide layer that exhibits excellent photocatalytic activity, and a method of producing the multilayer structure.

The present inventors have made an intensive study and found that when the configuration described below is employed, a titanium oxide layer exhibits excellent photocatalytic activity. Aspects of the invention have been thus completed.

Specifically, aspects of the present invention provide the following [1] to [6].

[1] A multilayer structure comprising:
a conductive portion containing a metal element A which is not Ti and having electrical conductivity; and
a titanium oxide layer disposed on the conductive portion and containing the metal element A in an amount of not less than 1.0 at %.

[2] The multilayer structure according to [1] above,
wherein the metal element A is at least one selected from the group consisting of Al, Ga, In, Sn, Pb, Bi, V, Cr, Mn, Fe, Co, Ni, Cu, Zn, Nb, Mo, Ru, Rh, Pd, Ag, W, Si and Sb.

[3] The multilayer structure according to [1] or [2] above,
wherein a proportion of anatase-type titanium dioxide in the titanium oxide layer is not less than 40.0%.

[4] The multilayer structure according to any one of [1] to [3] above, further including at least one type of base selected from the group Consisting of a metallic base, a ceramic base and a resin base,
wherein the conductive portion is disposed on the base.

[5] A method of producing the multilayer structure according to any one of [1] to [4] above, the method comprising:
carrying out cathodic electrolysis treatment in a treatment solution containing a Ti component by use of, as a cathode, a conductive portion containing a metal element A which is not Ti and having electrical conductivity, whereby a titanium oxide layer containing the metal element A in an amount of not less than 1.0 at % is formed on the conductive portion.

[6] The method according to [5] above,
wherein a no current applied time from when the conductive portion is immersed into the treatment solution to when the cathodic electrolysis treatment is started is not less than 6.0 seconds.

Aspects of the present invention provide a multilayer structure having a titanium oxide layer that exhibits excellent photocatalytic activity, and a method of producing the multilayer structure.

BRIEF DESCRIPTION OF DRAWINGS

The FIGURE is a graph showing the evaluation results of organic substance decomposition property of Test Materials Nos. 17 and 40.

DETAILED DESCRIPTION OF EMBODIMENTS OF THE INVENTION

[Multilayer Structure]
The multilayer structure according to aspects of the invention is a multilayer structure comprising: a conductive portion containing a metal element A which is not Ti and having electrical conductivity; and a titanium oxide layer disposed on the conductive portion and containing the metal element A in an amount of not less than 1.0 at %.

In the multilayer structure according to aspects of the invention as above, the titanium oxide layer exhibits excellent photocatalytic activity. Specifically, it is preferable for the titanium oxide layer to at least have an "organic substance decomposition property" to be described later and more preferable to further have "superhydrophilicity" to be described later.

The reason why the above effects can be obtained is not clear but is probably that when the metal element A is incorporated into the titanium oxide layer, many oxygen deficiency sites are introduced into the titanium oxide layer, and since the oxygen deficiency sites have similar properties to those of positive holes (that are formed due to transition of electrons from the valence band to the conduction band in the titanium oxide layer upon, for instance, UV irradiation), the titanium oxide layer exhibits excellent photocatalytic activity.

Besides, the proportion of anatase-type titanium dioxide in the titanium oxide layer sometimes increases, and also in this case, the titanium oxide layer should exhibit excellent photocatalytic activity.

The foregoing mechanisms are, however, presumptions and even if the above effects are obtained through any other mechanism than those, such a mechanism is also considered to be within the scope of the invention.

Patent Literature 2 discloses a photocatalyst layer using an amorphous titanium oxide with no photocatalytic activity as a binder and having crystalline titanium oxide fine particles with photocatalytic activity dispersed in the binder. When attention is paid to the "organic substance decomposition property" for example, in the photocatalyst layer of Patent Literature 2, it seems that this effect appears only when the crystalline titanium oxide fine particles present in the outermost surface come into contact with an organic substance.

In contrast, the titanium oxide layer in the multilayer structure according to aspects of the invention is not configured to have crystalline titanium oxide fine particles being dispersed therein, and should exhibit the above effect in a wider range.

Next, each portion of the multilayer structure according to aspects of the invention is described.

<Conductive Portion>

The conductive portion contains the metal element A which is not Ti and has electrical conductivity.

The expression "the conductive portion has electrical conductivity" means that the conductive portion has the property of conducting electricity, and more specifically, has a resistivity of up to $1.0 \times 10^{-2}$ Ωcm.

The shape of the conductive portion is for instance a plate shape but is not particularly limited thereto and may be a linear or particulate shape. The size (dimension) of the conductive portion is appropriately set.

<<Metal Element A>>

A specific example of the metal element A which is not Ti (hereinafter also simply called "element A") is at least one selected from the group consisting of Al, Ga, In, Sn, Pb, Bi, V, Cr, Mn, Fe, Co, Ni, Cu, Zn, Nb, Mo, Ru, Rh, Pd, Ag, W, Si and Sb, preferably at least one selected from the group consisting of Al, Sn, Cr, Co, Ni, Cu and Zn, and more preferably at least one selected from the group consisting of Sn, Cr, Ni, Cu and Zn.

The element A may be a combination of two or more elements.

The element A content of the conductive portion is not particularly limited.

However, the element A content of the conductive portion used in the production method according to aspects of the invention, which will be described later, is for instance not less than 5 mass %, preferably not less than 10 mass %, and more preferably not less than 15 mass % because this facilitates incorporation of the element A in an amount of not less than 1.0 at % into the titanium oxide layer.

Furthermore, the element A content of the conductive portion used in the production method according to aspects of the invention to be described later is even more preferably not less than 85 mass %, particularly preferably not less than 93 mass %, and most preferably not less than 98 mass % because this further facilitates incorporation of the element A into the titanium oxide layer.

When the element A is a combination of two or more elements, the element A content of the conductive portion is the total content of those elements.

<<Another Element than Element A>>

The conductive portion may contain another element (element B) than the element A. The element B is, for instance, at least one selected from the group consisting of O, N and C. In other words, the conductive portion may contain an oxide of the element A, a nitride of the element A, a carbide of the element A, or the like as long as it has electrical conductivity.

<Base>

The multilayer structure according to aspects of the invention may include a base. When the multilayer structure according to aspects of the invention includes a base, the conductive portion described above is disposed on the base.

The shape of the base is for instance a plate or linear shape but is not particularly limited thereto. The size of the base is appropriately set.

A favorable example of the base as above is at least one selected from the group consisting of a metallic base, a ceramic base and a resin base.

<<Metallic Base>>

The type of metal serving as a material of the metallic base is not particularly limited, and examples thereof include iron, nickel, cobalt, silver, zinc, copper, magnesium, aluminum, tin, manganese, and alloys containing such metals. Preferred examples of alloys containing iron include steel and stainless steel.

A method of providing the conductive portion described above on the metallic base is not particularly limited, and examples thereof include: electroplating or electroless plating using an element A-containing aqueous solution or nonaqueous solution; hot dipping involving immersion into element A-containing molten metal; physical vapor deposition; chemical vapor deposition; and thermal spraying.

<<Ceramic Base>>

The type of ceramic serving as a material of the ceramic base is not particularly limited, and examples thereof include: oxides such as aluminum oxide, zirconium oxide, zinc oxide, titanium oxide, chromium oxide, silicon oxide, magnesium oxide and tin oxide; carbides such as silicon carbide, boron carbide, titanium carbide, zirconium carbide, niobium carbide, chromium carbide and tungsten carbide; nitrides such as boron nitride, silicon nitride, titanium nitride, niobium nitride and aluminum nitride; borides such as aluminum boride, silicon boride, titanium boride, zirconium boride and chromium boride; and glasses such as soda-lime glass, fused quartz, lead glass, borosilicate glass and fused quartz. These may be used alone or in combination of two or more.

A method of providing the conductive portion described above on the ceramic base is not particularly limited. In the case of ceramic bases having electrical conductivity, exemplary methods include electroplating using an element A-containing aqueous solution or nonaqueous solution, while in the case of ceramic bases having no electrical conductivity, exemplary methods include: electroless plating using an element A-containing aqueous solution or nonaqueous solution; hot dipping involving immersion into element A-containing molten metal; physical vapor deposition; chemical vapor deposition; and thermal spraying.

<<Resin Base>>

The type of resin serving as a material of the resin base is not particularly limited, and examples thereof include: thermosetting resins such as unsaturated polyester resin, acrylic resin, vinyl ester resin, alkyd resin, amino resin, epoxy resin, urethane resin, phenolic resin, and silicone resin; and thermoplastic resins such as polyethylene resin, polypropylene resin, polystyrene resin, polybutadiene resin, styrene-butadiene resin, polyacetal resin, polyamide resin, polycarbonate resin, polyphenylene ether resin, polyethylene terephthalate resin, polybutylene terephthalate resin, polyarylate resin, polystyrene resin, polyethersulfone resin, polyimide resin, polyamide-imide resin, polyphenylene sulfide resin, polyoxybenzoyl resin, polyetheretherketone resin, polyetherimide resin, and cellulose acetate resin. These may be used alone or in combination of two or more.

A method of providing the conductive portion described above on the resin base is not particularly limited. In the case of resin bases having electrical conductivity, exemplary methods include electroplating using an element A-containing aqueous solution or nonaqueous solution. In the case of resin bases having no electrical conductivity, exemplary methods include: electroless plating using an element A-containing aqueous solution or nonaqueous solution;

physical vapor deposition; chemical vapor deposition; and thermal spraying, each of which is carried out after a surface of the relevant resin base is subjected to suitable pretreatment.

<Titanium Oxide Layer>

When the multilayer structure according to aspects of the invention has the conductive portion of plate shape, the titanium oxide layer has a deposition amount in terms of Ti amount per one side of the conductive portion (hereinafter also called "Ti deposition amount") of preferably 5.0 to 1000.0 mg/m$^2$, more preferably 7.0 to 500.0 mg/m$^2$, and even more preferably 10.0 to 50.0 mg/m$^2$.

The Ti deposition amount is measured by surface analysis using X-ray fluorescence. The X-ray fluorescence spectrometry is performed under, for instance, the following conditions:

Apparatus: System 3270 X-ray fluorescence spectrometer, manufactured by Rigaku Corporation
Measurement diameter: 30 mm
Measurement atmosphere: Vacuum
Spectrum: Ti—Kα
Slit: COARSE
Dispersive crystal: TAP Use is made of the count number of peaks of Ti—Kα in the X-ray fluorescence spectrometry of the titanium oxide layer as measured under the foregoing conditions. Reference samples with known deposition amounts are used to specify a calibration curve for the Ti deposition amount in advance, and the calibration curve is used to relatively determine the Ti deposition amount.

<<Element A in Titanium Oxide Layer>>

As described above, the effect of photocatalytic activity occurs probably upon incorporation of the element A into the titanium oxide layer.

The effect as above is obtained when the element A content of the titanium oxide layer is not less than 1.0 at %. The element A content of the titanium oxide layer is preferably not less than 5.0 at %, more preferably not less than 10.0 at %, even more preferably not less than 20.0 at % and particularly preferably not less than 30.0 at %.

When the element A is excessively incorporated into the titanium oxide layer, the titanium oxide content of the titanium oxide layer decreases, and this may cause insufficient photocatalytic activity of the titanium oxide layer.

Thus, the element A content of the titanium oxide layer is preferably not more than 90.0 at %, more preferably not more than 75.0 at % and even more preferably not more than 55.0 at %.

When the element A is a combination of two or more elements, the element A content of the titanium oxide layer is the total content of those elements.

The element A content of the titanium oxide layer is determined by energy dispersive X-ray spectrometry (EDX) in observation of a cross section of the multilayer structure using a scanning electron microscope (SEM) or a transmission electron microscope (TEM).

Specifically, first, a cross section of the multilayer structure having the conductive portion and the titanium oxide layer is exposed by focused ion beam (FIB) machining or by use of a microtome. Next, the cross section is observed by a method that is chosen depending on the thickness of the titanium oxide layer. For instance, SEM is used when the thickness of the titanium oxide layer is 1 μm or more, while the cross section is observed with TEM when the thickness of the titanium oxide layer is less than 1 μm. The distance L from the surface of the conductive portion (i.e., the surface of the conductive portion in contact with the titanium oxide layer) to the surface of the titanium oxide layer (i.e., the surface of the titanium oxide layer opposite from the surface in contact with the conductive portion) is determined in a given observation field. In the position L/3 away from the surface of the titanium oxide layer toward the surface of the conductive portion, elemental mapping using EDX is conducted on the titanium oxide layer in an area whose one side is L/9, thereby measuring the proportions (unit: at %) of elements contained in the titanium oxide layer. This measurement is carried out with given ten fields. The average of the obtained proportions (unit: at %) of the element A in the ten fields is determined as the element A content of this titanium oxide layer.

<<Anatase-Type Titanium Dioxide in Titanium Oxide Layer>>

The titanium oxide layer preferably contains anatase-type titanium dioxide. Upon UV irradiation for instance, Ti—O—Ti bonds of anatase-type titanium dioxide change to Ti—OH HO—Ti, and the titanium oxide layer improves in hydrophilicity and wettability with respect to water; in other words, the water drop contact angle becomes smaller.

The proportion of anatase-type titanium dioxide in the titanium oxide layer is preferably not less than 40.0%, more preferably not less than 46.5%, even more preferably not less than 50.0%, and particularly preferably not less than 60.0% for the reason that the titanium oxide layer can have more excellent photocatalytic activity.

In this case, it is favorable that the element A in the titanium oxide layer be at least one selected from the group consisting of Al, Ga, In, Sn, Pb, Bi, V, Cr, Mn, Fe, Co, Cu, Zn, Nb, Mo, Ru, Rh, Pd, Ag, W, Si and Sb.

The proportion of anatase-type titanium dioxide in the titanium oxide layer is determined through observation of a cross section of the multilayer structure using a spherical aberration corrected high-resolution transmission electron microscope (high-resolution TEM).

Specifically, first, a cross section of the multilayer structure having the conductive portion and the titanium oxide layer is exposed by focused ion beam (FIB) machining or by use of a microtome. Next, the cross section is observed with a high-resolution TEM. The distance L from the surface of the conductive portion (i.e., the surface of the conductive portion in contact with the titanium oxide layer) to the surface of the titanium oxide layer (i.e., the surface of the titanium oxide layer opposite from the surface in contact with the conductive portion) is determined in a given observation field. A high-resolution image is obtained from the titanium oxide layer in the position L/3 away from the surface of the titanium oxide layer toward the surface of the conductive portion. The Fourier Transform is implemented on the obtained high-resolution image, the lattice constant is calculated, and a titanium dioxide region having the crystal structure of anatase phase is determined. The ratio of the area of the titanium dioxide region constituted of anatase phase to the area of the titanium oxide layer in the high-resolution image is used to determine the proportion of anatase-type titanium dioxide in the titanium oxide layer. This measurement is carried out with given ten fields. The average of the obtained proportions of anatase-type titanium dioxide in the ten fields is determined as the proportion of anatase-type titanium dioxide in this titanium oxide layer.

<Applications of Multilayer Structure>

The application of the multilayer structure according to aspects of the invention is not particularly limited, and for example, the multilayer structure is used as a member of various products required to provide photocatalytic function for the purposes of air purification, deodorization and water purification as well as imparting antibacterial and antifouling properties. Aside from that, the multilayer structure is also used as a member of a hydrogen generation catalyst, a transparent electrode, and a perovskite-type dye-sensitized solar cell.

[Method of Producing Multilayer Structure]

Next, a method of producing a multilayer structure according to aspects of the present invention (hereinafter also simply called "production method according to aspects of the invention") is described below.

The production method according to aspects of the invention is a method of producing the multilayer structure according to aspects of the invention described above and is a method in which cathodic electrolysis treatment is carried out in a treatment solution containing a Ti component by use of, as the cathode, the conductive portion containing the metal element A which is not Ti and having electrical conductivity, thereby forming the above-described titanium oxide layer on this conductive portion.

Patent Literature 1 discloses a method of forming a photocatalyst layer by a sol-gel process, followed by heat treatment at, for instance, 450° C. The method of Patent Literature 1 limits usable types of bases because, for example, a base made of resin with a low melting point melts by heat treatment.

In contrast, the production method according to aspects of the invention does not require heat treatment or the like after formation of the titanium oxide layer, and accordingly, a base made of resin with a low melting point or another material can also be used.

<Treatment Solution>

The treatment solution contains a Ti component (Ti compound) for supplying Ti (elemental titanium) to the titanium oxide layer to be formed.

The Ti component is not particularly limited, and examples thereof include titanalkoxide ($Ti(OR)_4$, where OR represents an alkoxy group), ammonium titanyl oxalate (($NH_4)_2[TiO(C_2O_4)_2]$), potassium titanyl oxalate dihydrate ($K_2[TiO(C_2O_4)_2] \cdot 2H_2O$), titanium sulfate ($Ti(SO_4)_2$)), titanium lactate ($Ti(OH)_2[OCH(CH_3)COOH]2$), hexafluorotitanic acid ($H_2TiF_6$) and/or their salts.

Examples of salts of hexafluorotitanic acid include potassium hexafluorotitanate ($K_2TiF_6$), sodium hexafluorotitanate ($Na_2TiF_6$), and ammonium hexafluorotitanate (($NH_4)_2TiF_6$).

Of these, hexafluorotitanic acid and/or its salts are preferred for the sake of stability of the treatment solution, availability, and other factors.

When any of hexafluorotitanic acid and/or its salts is used, the Ti content of the treatment solution is preferably 0.004 to 0.400 mol/L and more preferably 0.020 to 0.200 mol/L.

The solvent in the treatment solution is typically water.

When the solvent is water, the pH of the treatment solution is not particularly limited and is for example 2.0 to 5.0. Known acid components (e.g., phosphoric acid and sulfuric acid) or alkaline components (e.g., sodium hydroxide and ammonia water) may be used for pH adjustment.

The treatment solution may optionally contain a surfactant such as sodium lauryl sulfate or acetylenic glycol. The treatment solution may contain condensed phosphate such as pyrophosphate for the sake of stability of deposition behavior over time.

The treatment solution has a temperature preferably of 20° C. to 80° C. and more preferably of 40° C. to 60° C.

The treatment solution may further contain a conduction aid.

Exemplary conduction aids include: sulfates such as potassium sulfate, sodium sulfate, magnesium sulfate and calcium sulfate; nitrates such as potassium nitrate, sodium nitrate, magnesium nitrate and calcium nitrate; and chloride salts such as potassium chloride, sodium chloride, magnesium chloride and calcium chloride.

The conduction aid content of the treatment solution is preferably 0.010 to 1.000 mol/L and more preferably 0.020 to 0.500 mol/L.

<Titanium Oxide Layer Formation Step>

The production method according to aspects of the invention includes a titanium oxide layer formation step.

The titanium oxide layer formation step is a step of forming the titanium oxide layer on the conductive portion by carrying out the cathodic electrolysis treatment in the treatment solution described above by use of the conductive portion as the cathode.

In this process, the conductive portion may be disposed on the base, and in this case, the cathodic electrolysis treatment is carried out by use of, as the cathode, either the base and the conductive portion (conducive portion-bearing base) or the conductive portion (conductive portion original sheet) alone. For the counter electrode, an insoluble electrode such as a platinum electrode is suitable.

<<Cathodic Electrolysis Treatment>>

The electrolysis current density in the cathodic electrolysis treatment is preferably 1.0 to 100.0 A/dm$^2$, more preferably 3.0 to 80.0 A/dm$^2$, and even more preferably 10.0 to 50.0 A/dm$^2$.

The current application time in the cathodic electrolysis treatment is appropriately set to achieve a desired Ti deposition amount.

<<No-Current Immersion Time>>

In the titanium oxide layer formation step, it is preferable to have a no current applied time that is from when the conductive portion (or the conductive portion-bearing base) is immersed into the treatment solution to when the cathodic electrolysis treatment is started (hereinafter also called "no-current immersion time").

In other words, before the cathodic electrolysis treatment is carried out, the conductive portion (or the conductive portion-bearing base) is preferably immersed in the treatment solution with no current being applied.

This allows the element A to be easily dissolved from the surface of the conductive portion into the treatment solution and introduced into the titanium oxide layer, and consequently, the element A content of the titanium oxide layer increases. Further, this leads to a higher proportion of anatase-type titanium dioxide in the titanium oxide layer, so that the effect of improving photocatalytic activity can easily be obtained.

The no-current immersion time is preferably not less than 6.0 seconds. A no-current immersion time of not less than 6.0 seconds allows the proportion of anatase-type titanium dioxide in the titanium oxide layer to easily reach 40.0% or more.

The no-current immersion time is more preferably not less than 10.0 seconds and even more preferably not less than 15.0 seconds.

The upper limit of the no-current immersion time is not particularly limited, and is preferably not more than 100.0 seconds, more preferably not more than 80.0 seconds and even more preferably not more than 50.0 seconds for improving productivity.

<<Rinsing with Water>>

The cathodic electrolysis treatment may be followed by rinsing with water.

The rinsing method is not particularly limited, and one exemplary method is immersion in water that follows the cathodic electrolysis treatment. The temperature of water for use in rinsing (water temperature) is preferably 40° C. to 90° C.

The rinsing time is preferably more than 0.5 seconds and preferably 1.0 to 5.0 seconds.

Further, drying may replace or follow rinsing with water. The temperature and the method of drying are not particularly limited, and a drying process using a typical drier or electric furnace may be employed for example. The drying temperature is preferably not more than 100° C.

<Pretreatment Step>

The production method according to aspects of the invention may include a pretreatment step described below that is carried out before the titanium oxide layer formation step for the purpose of removing a naturally oxidized film formed on the surface of the conductive portion and other purposes.

The pretreatment step is a step of subjecting the conductive portion (or the conductive portion-bearing base) to cathodic electrolysis treatment in an aqueous alkaline solution (e.g., an aqueous sodium carbonate solution).

An exemplary solution for use in the pretreatment step, i.e., cathodic electrolysis treatment, is an aqueous alkaline solution (e.g., aqueous sodium carbonate solution). The alkali component (e.g., sodium carbonate) content of the aqueous alkaline solution is preferably 5 to 15 g/L and more preferably 8 to 12 g/L.

The temperature of the aqueous alkaline solution during the cathodic electrolysis treatment is preferably 40° C. to 60° C.

Electrolysis conditions (current density and electrolysis time) for the cathodic electrolysis treatment are appropriately adjusted.

The cathodic electrolysis treatment may optionally be followed by rinsing with water.

EXAMPLES

The present invention is specifically described below with reference to examples. However, the present invention should not be construed as being limited to the following examples.

<Conductive Portion Original Sheet>

For the conductive portion original sheet, use was made of an Al sheet (purity: 99 mass % or more), an In sheet (purity: 99.99 mass %), a Sn sheet (purity: 99.9 mass %), a Pb sheet (purity: 99.99 mass %), a V sheet (purity: 99.7 mass %), an Fe sheet (purity: 99.99 mass %), a Co sheet (purity: 99.9 mass %), a Cu sheet (purity: 99.96 mass %), a Zn sheet (purity: 99.5 mass %), a Nb sheet (purity: 99.9 mass %), a Mo sheet (purity: 99.95 mass %), a Pd sheet (purity: 99.95 mass %), a Ag sheet (purity: 99.98 mass %) or a W sheet (purity: 99.95 mass %) with 0.3 mm thickness, 100 mm length and 100 mm width, or a Cr foil (purity: 99.9 mass %), a Mn foil (purity: 99 mass %) or a Rh foil (purity: 99.9 mass %) with 0.025 mm thickness (all manufactured by The Nilaco Corporation). The conductive portion original sheets themselves functioned as the conductive portions.

<Manufacture of Conductive Portion-Bearing Base (Base: Made of Metal)>

Various types of conductive portion-bearing bases (base: made of metal) were manufactured as follows.

<<Conductive Portion-bearing Base 1-1 (Sn)>>

A 0.22 mm-thick, 200 mm-long and 100 mm-wide steel sheet (T4 base sheet: a cold rolled steel sheet whose tempered grade defined in JIS G 3303 is equivalent to T-4) was subjected to electrolytic degreasing and then plated using a Sn-plating bath (stannous sulphate, 30 g/L; sulfuric acid, 100 g/L) to have, on each surface thereof, a Sn layer in a Sn deposition amount per one side of 5.0 g/m$^2$.

<<Conductive Portion-Bearing Base 1-2 (Zn)>>

A 0.22 mm-thick steel sheet (T4 base sheet) was subjected to electrolytic degreasing and then plated using a Zn-plating bath (zinc sulfate heptahydrate, 440 g/L) to have, on each surface thereof, a Zn layer in a Zn deposition amount per one side of 5.0 g/m$^2$.

<<Conductive Portion-Bearing Base 1-3 (Cr)>>

A 0.22 mm-thick steel sheet (T4 base sheet) was subjected to electrolytic degreasing and then plated using a Cr-plating bath (chromic acid, 200 g/L; sulfuric acid, 3 g/L) to have, on each surface thereof, a Cr layer in a Cr deposition amount per one side of 0.1 g/m$^2$.

<<Conductive Portion-Bearing Base 1-4 (Ni)>>

A 0.22 mm-thick steel sheet (T4 base sheet) was subjected to electrolytic degreasing and then plated using a Ni-plating bath (nickel sulfate, 240 g/L; nickel chloride, 80 g/L; boric acid, 30 g/L) to have, on each surface thereof, a Ni layer in a Ni deposition amount per one side of 0.1 g/m$^2$.

<<Conductive Portion-Bearing Base 1-5 (Bi)>>

A 0.22 mm-thick steel sheet (T4 base sheet) was subjected to electrolytic degreasing and then provided with, on its one surface, a Bi layer in a Bi deposition amount per one side of 0.1 g/m$^2$ by physical vapor deposition.

<<Conductive Portion-Bearing Base 1-6 (Ga)>>

A 0.22 mm-thick steel sheet (T4 base sheet) was subjected to electrolytic degreasing and then provided with, on its one surface, a Ga layer in a Ga deposition amount per one side of 0.1 g/m$^2$ by physical vapor deposition.

<<Conductive Portion-Bearing Base 1-7 (Ru)>>

A 0.22 mm-thick steel sheet (T4 base sheet) was subjected to electrolytic degreasing and then provided with, on its one surface, a Ru layer in a Ru deposition amount per one side of 0.1 g/m$^2$ by physical vapor deposition.

<<Conductive Portion-Bearing Base 1-8 (Si)>>

A 0.22 mm-thick steel sheet (T4 base sheet) was subjected to electrolytic degreasing and then provided with, on its one surface, a Si layer in a Si deposition amount per one side of 0.1 g/m$^2$ by physical vapor deposition.

<Manufacture of Conductive Portion-Bearing Base (Base: Made of Ceramic Material)>

Various types of conductive portion-bearing bases (base: made of ceramic material) were manufactured as follows.

<<Conductive Portion-Bearing Base 2-1 (Sn)>>

A 1.0 mm-thick soda-lime glass sheet was provided with, on its one surface, a Sn layer in a Sn deposition amount per one'side of 500 mg/m$^2$ by physical vapor deposition.

<<Conductive Portion-Bearing Base 2-2 (Zn)>>

A 1.0 mm-thick soda-lime glass sheet was provided with, on its one surface, a Zn layer in a Zn deposition amount per one side of 500 mg/m$^2$ by physical vapor deposition.

<<Conductive Portion-Bearing Base 2-3 (Cr)>>

A 1.0 mm-thick fused quartz sheet was provided with, on its one surface, a Cr layer in a Cr deposition amount per one side of 500 mg/m$^2$ by physical vapor deposition.

<Manufacture of Conductive Portion-Bearing Base (Base: Made of Resin)>

Various types of conductive portion-bearing bases (base: made of resin) were manufactured as follows.

<<Conductive Portion-Bearing Base 3-1 (Sn)>>

A 1.0 mm-thick ABS resin sheet was subjected to degreasing, etching, catalyst treatment (treatment of providing a catalyst composed of Pd and Sn) and accelerator treatment (treatment of metalizing Pd and making it to a plating catalyst) by industrially common methods and thereafter to electroless nickel plating using a Ni-plating bath (nickel sulfate, 20 g/L; sodium acetate, 5 g/L; sodium hypophosphite, 10 g/L; sodium citrate, 5 g/L; lactic acid, 3 mL/L), and then provided with, on its one surface, a Sn layer in a Sn deposition amount per one side of 500 mg/m².

<<Conductive Portion-Bearing Base 3-2 (Zn)>>

A 1.0 mm-thick ABS resin sheet was subjected to degreasing, etching, catalyst treatment and accelerator treatment by industrially common methods similarly to the above and thereafter to electroless nickel plating, and then provided with, on its one surface, a Zn layer in a Zn deposition amount per one side of 500 mg/m².

<<Conductive Portion-Bearing Base 3-3 (Cr)>>

A 1.0 mm-thick ABS resin sheet was subjected to degreasing, etching, catalyst treatment and accelerator treatment by industrially common methods similarly to the above and thereafter to electroless nickel plating, and then provided with, on its one surface, a Cr layer in a Cr deposition amount per one side of 500 mg/m².

<<Conductive Portion-Bearing Base 3-4 (Sn, Sb)>>

T-1 transparent conductive powder (Sn—Sb Oxide) manufactured by Mitsubishi Materials Electronic Chemicals Co., Ltd. was dispersed to a concentration of 80 mass % in polyester which serves as a binder, thus obtaining a composition. This composition was applied on a 100 μm-thick polyester film to a coating thickness of 1 μm.

<Manufacture of Multilayer Structure>

Test materials of multilayer structures were manufactured using the conductive portion original sheets and the conductive portion-bearing bases.

More specifically, as shown in Tables 2 and 3 below, the conductive portion original sheets described above were used for Test Materials Nos. 1 to 13, 15 to 26 and 47 to 50, and the conductive portion-bearing bases described above were used for Test Materials Nos. 27 to 33, 36 to 46, 51 and 52.

In Tables 2 and 3 below, the relevant conductive portion original sheets and conductive portion-bearing bases are shown as used. Note that the conductive portion-bearing bases are stated in a shortened form. To be more specific, for instance, "conductive portion-bearing base 1-1 (Sn)" is represented as "1-1 (Sn)."

After the pretreatment step described below was optionally carried out, the test materials of multilayer structures were manufactured through the titanium oxide layer formation step 1 described below for Test Materials Nos. 1 to 13, 15 to 33, 36 to 46, 51 and 52 and through the titanium oxide layer formation step 2 described below for Test Materials Nos. 47 to 50.

<<Pretreatment Step>>

A conductive portion original sheet or conductive portion-bearing base was immersed in 10 g/L aqueous sodium carbonate solution at a bath temperature of 50° C. and subjected to cathodic electrolysis treatment under such conditions as a current density of 2.0 A/dm², a current application time of 0.5 seconds and an electric quantity density of 1.0 C/dm².

<<Titanium Oxide Layer Formation Step 1>>

The conductive portion original sheet or conductive portion-bearing base having undergone the pretreatment step was rinsed with water and subjected to cathodic electrolysis treatment under the conditions shown in Tables 2 or 3 below by use of a treatment solution (solvent, water; solution temperature, 50° C.) having the composition shown in Table 1 below with the pH being adjusted to 4.0. Thus, the conductive portion original sheet or the conductive portion-bearing base was provided on its one or both sides with a titanium oxide layer or layers, thereby obtaining a test material of a multilayer structure.

After the cathodic electrolysis treatment, the resulting test material of a multilayer structure was rinsed with water and dried with a blower at room temperature. Rinsing with water was carried out by immersing the test material in a tank containing water at 85° C. for only 2.0 seconds.

<<Titanium Oxide Layer Formation Step 2>>

The conductive portion original sheet or conductive portion-bearing base having undergone the pretreatment step was rinsed with water and then immersed in a sol with titanium tetraisopropoxide:pure water:nitric acid=1:1:0.5 in volume ratio for a certain period of time, followed by drying with hot air at 85° C. Thus, the conductive portion original sheet or the conductive portion-bearing base was provided on its surface with a titanium oxide layer, thereby obtaining a test material of a multilayer structure.

<Evaluation>

With the manufactured test materials of multilayer structures, the Ti deposition amount, the element A content, and the proportion of anatase-type titanium dioxide of each titanium oxide layer were determined by the above-described methods. The results thereof are shown in Tables 4 and 5 below.

Note that for all the manufactured test materials of multilayer structures, the electrical conductivity of the conductive portion was checked with a four-terminal resistance measurement device, and the results confirmed that the conductive portions of all the test materials had a resistivity of not higher than $1.0 \times 10^{-2}$ Ωcm.

In all the test materials, a layer formed on the conductive portion was confirmed to be a titanium oxide layer containing $TiO_2$.

Specifically, the presence of O and Ti was confirmed through narrow spectra measurement for O is and Ti 2p using an X-ray photoelectron spectroscope. Further, the binding energy was calibrated using the peak position of C is narrow spectrum, and Ti was confirmed to be tetravalent on the basis of the binding energy value of the peak of Ti 2p narrow spectrum. From the foregoing facts, a layer formed on the conductive portion was confirmed to be a titanium oxide layer containing $TiO_2$.

In addition, the manufactured test materials of multilayer structures were evaluated for the following items. The evaluation results are shown in Tables 4 and 5 below.

<<Organic Substance Decomposition Property>>

A specimen with a diameter of 35 mm was punched out of each manufactured test material of a multilayer structure. In order to remove organic substances adsorbed on a surface of the titanium oxide layer of the obtained specimen, the specimen was irradiated with black light emitting UV rays at an intensity of 2 mW/cm² for 24 hours. Thereafter, the specimen was immersed in 20 μmol/L aqueous methylene blue solution under no light for 24 hours (to allow methylen blue to adsorb onto the surface of the titanium oxide layer of the specimen to the saturation point).

Subsequently, the specimen was set on the bottom of a transparent glass container with an inner diameter of 40 mm and a height of 3 cm containing 35 mL of 10 μmol/L aqueous methylene blue solution therein with the surface of the titanium oxide layer facing upward, and irradiated with black light (where the black light was adjusted such that UV rays penetrating the aqueous methylene blue solution and the bottom of the glass container had an intensity of 1.0 mW/cm²).

The absorbance of the aqueous methylene blue solution at 664 nm was measured using a spectrophotometer 20, 40, 60, 80, 100, 120, 140, 160 and 180 minutes after the start of black light irradiation. The concentration of methylene blue in the aqueous methylene blue solution at each elapsed time was calculated based on the absorbance of the aqueous methylene blue solution measured before the specimen was immersed.

With the horizontal axis representing the UV irradiation time (unit: min) and the vertical axis representing the concentration of methylene blue (unit: pmol/L), and defining the inclination of the straight line as the decomposition activity index R (nmol/L/min), the photocatalytic activity (organic substance decomposition property) was evaluated according to the following criteria. The results of Test Materials Nos. 17 and 49 are shown in the graph of the FIGURE as examples.

For practical use, when the result is A, B or C, the titanium oxide layer is determined to have the organic substance decomposition property and rated as having excellent photocatalytic activity.

A: $15 \geq R$
B: $10 \geq R < 15$
C: $5 \geq R < 10$
D: $R < 5$

<<Superhydrophilicity>>

The surface of the titanium oxide layer having been just formed was in a superhydrophilic state (water drop contact angle: 10° or less), and therefore, the manufactured test material of a multilayer structure was left to stand in a room for 20 days such that the surface of the titanium oxide layer turned to a hydrophobic state (water drop contact angle: 80° or more). Thereafter, the surface of the titanium oxide layer was irradiated with UV light. Specifically, irradiation was carried out at an intensity of 96 mW/cm² for 10 minutes using a mercury lamp. The water drop contact angle on the surface of the titanium oxide layer was measured before and after the UV irradiation. At this time, the static contact angle was obtained by means of a contact angle meter (CA-D type, manufactured by Kyowa Interface Science Co., Ltd.) (relative humidity, 55% to 66%; temperature, 20° C.).

The amount of change in water drop contact angle after UV irradiation relative to that before UV irradiation ($\Delta\theta$: contact angle [°] before UV irradiation-contact angle [°] after UV irradiation) was obtained, and this amount of change ($\Delta\theta$) was used to evaluate the photocatalytic activity according to the following criteria.

For practical use, when the result is A, B or C, the titanium oxide layer is determined to have superhydrophilicity and rated as having excellent photocatalytic activity.

A: $80° \geq \Delta\theta$
B: $40° \geq \Delta\theta < 80°$
C: $20° \geq \Delta\theta < 40°$
D: $\Delta\theta < 20°$

TABLE 1

| Type of treatment solution | Ti component Type | Content [mol/L] | Conduction aid Type | Content [mol/L] |
|---|---|---|---|---|
| 1 | Potassium hexafluorotitanate | 0.042 | — | — |
| 2 | Potassium hexafluorotitanate | 0.042 | Potassium sulfate | 0.100 |
| 3 | Hexafluorotitanic acid | 0.042 | Potassium sulfate | 0.100 |

TABLE 2

| Test material No. | Type of conductive portion original sheet | Type of treatment solution | Titanium oxide layer formation step Type | No-current immersion time [sec] | Current density [A/dm²] | Current application time [sec] | Electric quantity density [C/dm²] | Remarks |
|---|---|---|---|---|---|---|---|---|
| 1 | Al sheet | 1 | 1 | 6.0 | 50.0 | 0.5 | 25.0 | Inventive example |
| 2 | In sheet | 1 | 1 | 6.0 | 50.0 | 0.5 | 25.0 | Inventive example |
| 3 | Sn sheet | 1 | 1 | 6.0 | 50.0 | 0.5 | 25.0 | Inventive example |
| 4 | Sn sheet | 1 | 1 | 0.01 | 50.0 | 0.5 | 25.0 | Inventive example |
| 5 | Sn sheet | 1 | 1 | 10.0 | 0.0 | 0 | 0.0 | Comparative example |
| 6 | Sn sheet | 1 | 1 | 30.0 | 50.0 | 0.5 | 25.0 | Inventive example |
| 7 | Sn sheet | 2 | 1 | 6.0 | 50.0 | 0.5 | 25.0 | Inventive example |
| 8 | Sn sheet | 3 | 1 | 6.0 | 50.0 | 0.5 | 25.0 | Inventive example |
| 9 | Pb sheet | 1 | 1 | 6.0 | 50.0 | 0.5 | 25.0 | Inventive example |
| 10 | V sheet | 1 | 1 | 6.0 | 50.0 | 0.5 | 25.0 | Inventive example |
| 11 | Fe sheet | 1 | 1 | 6.0 | 50.0 | 0.5 | 25.0 | Inventive example |
| 12 | Fe sheet | 1 | 1 | 3.0 | 50.0 | 0.5 | 25.0 | Inventive example |
| 13 | Co sheet | 1 | 1 | 6.0 | 50.0 | 0.5 | 25.0 | Inventive example |
| 15 | Cu sheet | 1 | 1 | 6.0 | 50.0 | 0.5 | 25.0 | Inventive example |
| 16 | Cu sheet | 1 | 1 | 1.0 | 50.0 | 0.5 | 25.0 | Inventive example |
| 17 | Zn sheet | 1 | 1 | 6.0 | 50.0 | 0.5 | 25.0 | Inventive example |
| 18 | Zn sheet | 1 | 1 | 5.0 | 50.0 | 0.5 | 25.0 | Inventive example |
| 19 | Nb sheet | 1 | 1 | 6.0 | 50.0 | 0.5 | 25.0 | Inventive example |
| 20 | Mo sheet | 1 | 1 | 6.0 | 50.0 | 0.5 | 25.0 | Inventive example |
| 21 | Pd sheet | 1 | 1 | 6.0 | 50.0 | 0.5 | 25.0 | Inventive example |
| 22 | Ag sheet | 1 | 1 | 6.0 | 50.0 | 0.5 | 25.0 | Inventive example |
| 23 | W sheet | 1 | 1 | 6.0 | 50.0 | 0.5 | 25.0 | Inventive example |
| 24 | Cr foil | 1 | 1 | 6.0 | 50.0 | 0.5 | 25.0 | Inventive example |
| 25 | Mn foil | 1 | 1 | 6.0 | 50.0 | 0.5 | 25.0 | Inventive example |
| 26 | Rh foil | 1 | 1 | 6.0 | 50.0 | 0.5 | 25.0 | Inventive example |

TABLE 3

| Test material No. | Type of conductive portion original sheet or conductive portion-bearing base | Type of treatment solution | Titanium oxide layer formation step Type | No-current immersion time [sec] | Current density [A/dm²] | Current application time [sec] | Electric quantity density [C/dm²] | Remarks |
|---|---|---|---|---|---|---|---|---|
| 27 | 1-1(Sn) | 1 | 1 | 6.0 | 50.0 | 0.5 | 25.0 | Inventive example |
| 28 | 1-1(Sn) | 1 | 1 | 6.0 | 10.0 | 0.5 | 5.0 | Inventive example |
| 29 | 1-1(Sn) | 1 | 1 | 6.0 | 100.0 | 0.5 | 50.0 | Inventive example |
| 30 | 1-1(Sn) | 1 | 1 | 6.0 | 50.0 | 3 | 150.0 | Inventive example |
| 31 | 1-1(Sn) | 1 | 1 | 6.0 | 50.0 | 60 | 3000.0 | Inventive example |
| 32 | 1-2(Zn) | 1 | 1 | 6.0 | 50.0 | 0.5 | 25.0 | Inventive example |
| 33 | 1-3(Cr) | 1 | 1 | 6.0 | 50.0 | 0.5 | 25.0 | Inventive example |
| 36 | 1-5(Bi) | 1 | 1 | 6.0 | 50.0 | 0.5 | 25.0 | Inventive example |
| 37 | 1-6(Ga) | 1 | 1 | 6.0 | 50.0 | 0.5 | 25.0 | Inventive example |
| 38 | 1-7(Ru) | 1 | 1 | 6.0 | 50.0 | 0.5 | 25.0 | Inventive example |
| 39 | 1-8(Si) | 1 | 1 | 6.0 | 50.0 | 0.5 | 25.0 | Inventive example |
| 40 | 2-1(Sn) | 1 | 1 | 6.0 | 50.0 | 0.5 | 25.0 | Inventive example |
| 41 | 2-2(Zn) | 1 | 1 | 6.0 | 50.0 | 0.5 | 25.0 | Inventive example |
| 42 | 2-3(Cr) | 1 | 1 | 6.0 | 50.0 | 0.5 | 25.0 | Inventive example |
| 43 | 3-1(Sn) | 1 | 1 | 6.0 | 50.0 | 0.5 | 25.0 | Inventive example |
| 44 | 3-2(Zn) | 1 | 1 | 6.0 | 50.0 | 0.5 | 25.0 | Inventive example |
| 45 | 3-3(Cr) | 1 | 1 | 6.0 | 50.0 | 0.5 | 25.0 | Inventive example |
| 46 | 3-4(Sn, Sb) | 1 | 1 | 6.0 | 50.0 | 0.5 | 25.0 | Inventive example |
| 47 | Sn sheet | — | 2 | 10.0 | — | — | — | Comparative example |
| 48 | Fe sheet | — | 2 | 10.0 | — | — | — | Comparative example |
| 49 | Zn sheet | — | 2 | 10.0 | — | — | — | Comparative example |
| 50 | Cr foil | — | 2 | 10.0 | — | — | — | Comparative example |
| 51 | 1-4(Ni) | 1 | 1 | 6.0 | 50.0 | 0.5 | 25.0 | Inventive example |
| 52 | 1-3(Cr) | 1 | 1 | 0.5 | 50.0 | 0.5 | 25.0 | Comparative example |

TABLE 4

| Test material No. | Conductive portion Type of element A | Titanium oxide layer Ti deposition amount [mg/m²] | Element A content [at %] | Proportion of anatase-type titanium dioxide [%] | Evaluation Organic substance decomposition property | Super-hydrophilicity | Remarks |
|---|---|---|---|---|---|---|---|
| 1 | Al | 20.2 | 10.2 | 41.5 | B | C | Inventive example |
| 2 | In | 20.3 | 8.1 | 51.3 | B | B | Inventive example |
| 3 | Sn | 19.7 | 24.8 | 55.0 | A | B | Inventive example |
| 4 | Sn | 20.6 | 2.1 | 14.9 | C | D | Inventive example |
| 5 | Sn | 0.0 | 0.0 | 0.0 | D | D | Comparative example |
| 6 | Sn | 21.1 | 35.4 | 62.1 | A | A | Inventive example |
| 7 | Sn | 19.5 | 45.3 | 70.2 | A | A | Inventive example |
| 8 | Sn | 18.9 | 13.8 | 49.4 | B | B | Inventive example |
| 9 | Pb | 20.0 | 7.7 | 41.3 | C | C | Inventive example |
| 10 | V | 20.4 | 7.1 | 46.6 | C | B | Inventive example |
| 11 | Fe | 20.9 | 6.1 | 41.0 | C | C | Inventive example |
| 12 | Fe | 20.7 | 1.0 | 12.2 | C | D | Inventive example |
| 13 | Co | 19.6 | 12.4 | 51.4 | B | B | Inventive example |
| 15 | Cu | 21.0 | 19.5 | 41.5 | B | C | Inventive example |
| 16 | Cu | 18.8 | 2.8 | 25.2 | C | D | Inventive example |
| 17 | Zn | 20.1 | 12.3 | 48.4 | A | B | Inventive example |
| 18 | Zn | 20.5 | 3.9 | 31.6 | B | D | Inventive example |
| 19 | Nb | 20.9 | 20.0 | 51.3 | B | B | Inventive example |
| 20 | Mo | 19.5 | 18.3 | 46.2 | B | C | Inventive example |
| 21 | Pd | 19.9 | 25.1 | 51.7 | A | B | Inventive example |
| 22 | Ag | 20.6 | 18.8 | 41.3 | B | C | Inventive example |
| 23 | W | 20.8 | 20.9 | 54.2 | B | B | Inventive example |
| 24 | Cr | 21.1 | 35.2 | 62.5 | A | A | Inventive example |
| 25 | Mn | 19.7 | 8.1 | 42.1 | C | C | Inventive example |
| 26 | Rh | 20.1 | 6.4 | 41.3 | C | C | Inventive example |

TABLE 5

| Test material No. | Conductive portion Type of element A | Ti deposition amount [mg/m²] | Element A content [at %] | Proportion of anatase-type titanium dioxide [%] | Evaluation Organic substance decomposition property | Super-hydrophilicity | Remarks |
|---|---|---|---|---|---|---|---|
| 27 | Sn | 20.3 | 25.2 | 55.3 | A | B | Inventive example |
| 28 | Sn | 9.9 | 65.4 | 75.2 | A | A | Inventive example |
| 29 | Sn | 49.4 | 19.2 | 48.4 | B | B | Inventive example |
| 30 | Sn | 102.5 | 13.4 | 44.3 | B | C | Inventive example |
| 31 | Sn | 804.5 | 8.4 | 42.4 | C | C | Inventive example |
| 32 | Zn | 21.1 | 12.2 | 47.9 | B | B | Inventive example |
| 33 | Cr | 19.7 | 34.7 | 60.5 | A | A | Inventive example |
| 36 | Bi | 20.8 | 25.4 | 56.2 | B | B | Inventive example |
| 37 | Ga | 20.9 | 45.0 | 66.2 | A | A | Inventive example |
| 38 | Ru | 20.0 | 12.3 | 42.5 | C | C | Inventive example |
| 39 | Si | 19.5 | 25.1 | 53.6 | B | B | Inventive example |
| 40 | Sn | 19.7 | 25.4 | 55.4 | B | B | Inventive example |
| 41 | Zn | 20.4 | 12.3 | 48.2 | B | B | Inventive example |
| 42 | Cr | 20.8 | 35.4 | 62.0 | A | A | Inventive example |
| 43 | Sn | 21.0 | 25.3 | 55.3 | B | B | Inventive example |
| 44 | Zn | 19.8 | 12.8 | 48.3 | B | B | Inventive example |
| 45 | Cr | 20.5 | 34.7 | 60.7 | A | A | Inventive example |
| 46 | Sn, Sb | 20.2 | Sn: 15.3 Sb: 19.6 | 50.9 | B | B | Inventive example |
| 47 | Sn | 108.0 | 0.0 | 0.0 | D | D | Comparative example |
| 48 | Fe | 110.5 | 0.0 | 0.0 | D | D | Comparative example |
| 49 | Zn | 98.2 | 0.0 | 0.0 | D | D | Comparative example |
| 50 | Cr | 100.5 | 0.0 | 0.0 | D | D | Comparative example |
| 51 | Ni | 20.5 | 1.2 | 0.0 | C | B | Inventive example |
| 52 | Cr | 19.8 | 0.4 | 0.0 | D | D | Comparative example |

In Tables 4 and 5 above, the underlined figures are those outside of the ranges of the invention.

As shown in Tables 4 and 5, the test materials of the inventive examples (Nos. 1 to 4, 6 to 13, 15 to 33, 36 to 46 and 51) had the organic substance decomposition property and exhibited excellent photocatalytic activity.

Of these, the test materials (Nos. 1 to 3, 6 to 11, 13, 0.15, 17, 19 to 33 and 36 to 46) with the no-current immersion time in the titanium oxide layer formation step being not less than 6.0 seconds, the element A content of the titanium oxide layer being not less than 5.0 at %, and the proportion of anatase-type titanium dioxide in the titanium oxide layer being not less than 40.0% further had superhydrophilicity and exhibited more excellent photocatalytic activity.

Besides, the test material (No. 51) with the element A being Ni also had superhydrophilicity and exhibited more excellent photocatalytic activity.

In contrast, the test materials (Nos. 5, 47 to 50 and 52) with the element A content of the titanium oxide layer being less than 1.0 at % did not have desired organic substance decomposition property or superhydrophilicity and exhibited insufficient photocatalytic activity.

The invention claimed is:

1. A multilayer structure comprising:
a conductive portion containing an element A which is not Ti and having electrical conductivity; and
a titanium oxide layer disposed on the conductive portion and containing the element A in an amount of not less than 1.0 at %,
wherein the element A is at least one selected from the group consisting of Al, Ga, In, Sn, Pb, Bi, V, Cr, Mn, Fe, Co, Zn, Nb, Mo, Ru, Rh, Pd, Ag, W, Si and Sb, and
wherein a proportion of anatase-type titanium dioxide in the titanium oxide layer is not less than 12.2%.

2. The multilayer structure according to claim 1, wherein a proportion of anatase-type titanium dioxide in the titanium oxide layer is not less than 40.0%.

3. The multilayer structure according to claim 1, further including at least one type of base selected from the group consisting of a metallic base, a ceramic base and a resin base,
wherein the conductive portion is disposed on the base.

4. A multilayer structure comprising:
a conductive portion containing a metal element A which is not Ti and having electrical conductivity; and
a titanium oxide layer disposed on the conductive portion and containing the metal element A in an amount of not less than 1.0 at %,
wherein the metal element A is Ni.

5. The multilayer structure according to claim 4, further including at least one type of base selected from the group consisting of a metallic base, a ceramic base, and a resin base,
wherein the conductive portion is disposed on the base.

* * * * *